(12) United States Patent
Kirstatter

(10) Patent No.: US 8,522,850 B2
(45) Date of Patent: Sep. 3, 2013

(54) METHOD AND AN APPARATUS FOR ASSEMBLING OR DISASSEMBLING A TYRE OF A VEHICLE WHEEL

(75) Inventor: Herrn Klaus Kirstatter, Wetzlar (DE)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 221 days.

(21) Appl. No.: 13/204,086

(22) Filed: Aug. 5, 2011

(65) Prior Publication Data

US 2012/0267054 A1 Oct. 25, 2012

(30) Foreign Application Priority Data

Apr. 21, 2011 (EP) .................................. 11163494

(51) Int. Cl.
*B60C 25/135* (2006.01)
(52) U.S. Cl.
USPC ............................................. 157/1; 157/1.22
(58) Field of Classification Search
USPC .................................. 157/1, 1.17, 1.22, 1.24
See application file for complete search history.

(56) References Cited

U.S. PATENT DOCUMENTS

| | | | |
|---|---|---|---|
| 6,125,904 A | 10/2000 | Kane et al. | |
| 6,234,232 B1 * | 5/2001 | Kane et al. | 157/1.24 |
| 6,659,153 B1 * | 12/2003 | Kupka | 157/1.24 |
| 6,877,544 B2 * | 4/2005 | Kane et al. | 157/1.24 |
| 8,342,223 B2 * | 1/2013 | Sotgiu | 157/1.28 |
| 8,387,675 B1 * | 3/2013 | Vaninger et al. | 157/1.24 |

FOREIGN PATENT DOCUMENTS

| | | |
|---|---|---|
| DE | 42 05 045 C1 | 2/1992 |
| EP | 2 100 756 A1 | 9/2009 |
| EP | 2 100 756 B1 | 12/2010 |

* cited by examiner

*Primary Examiner* — David B Thomas
(74) *Attorney, Agent, or Firm* — McDermott Will & Emery LLP

(57) ABSTRACT

The present invention is related to a method and an apparatus for assembling a tire (1) onto the rim (2) of a vehicle wheel or for disassembling a tire (1) from the rim (2) of a vehicle wheel. There is provided an electric motor (3) for rotationally driving the rim (2) and the tire (1) during the assembling or disassembling operation, tools (4, 5) for assembling or disassembling the tire (1) onto the rim (2) or from the rim (2), measuring means (6, 15, 16, 18) for measuring the tire temperature and/or forces acting on the tire during the assembling or disassembling operation, and recording means (7) for recording on at least one data carrier the measured values of the tire temperature and/or of the forces acting on the tire during the assembling or disassembling operation.

15 Claims, 4 Drawing Sheets

METHOD AND AN APPARATUS FOR ASSEMBLING OR DISASSEMBLING A TYRE OF A VEHICLE WHEEL

The invention concerns a method and an apparatus for assembling a tyre onto a rim of a vehicle wheel or disassembling a tyre from a rim of a vehicle wheel.

EP 2 100 756 B1 discloses a method and an apparatus for assembling a tyre onto a rim of a vehicle wheel, wherein the core temperature of the tyre is measured before the assembling operation. The method and apparatus are used especially for assembling runflat tyres or UHP (Ultra High Performance) tyres. The core temperature should be between 15° C. and 20° C. for the assembling operation.

DE 42 05 045 C2 describes a method and an apparatus for assembling a tyre onto the rim of a vehicle wheel, wherein the electric current drained by the electric motor during the assembling operation is measured in order to control the amount of current supplied to the electric motor until to a predetermined maximum current amount is reached.

During the assembling operation and during the disassembling operation, the rim and the tyre are driven by the torque transmitted from the electric motor and rotated with respect to the assembling or disassembling tool which engages the bead of the tyre. The rim is driven by the electric motor and the tyre is in friction contact with the rim edge within a traction point or traction area in which the bead of the tyre changes from the upper side of the rim to the rim bed. The frictional forces at the traction point or traction area can become extremely strong during the course and especially at the end of the assembling or disassembling operation when the tyre moves completely into the rim bed so that there is the risk that the tyre material is damaged. Further, the temperature of the tyre, especially of the tyre core should be maintained within a temperature range of about 15° C. to 27° C.

An object of the invention is to provide a method and an apparatus which enable the observation of correct assembling or disassembling a tyre onto or from a rim of a vehicle wheel.

According to the invention, the problem is solved by the method having the features of claim 1 and by the apparatus having the features of claim 9.

The invention provides a method for assembling a tyre onto a rim of a vehicle wheel or disassembling a tyre from a rim of a vehicle wheel, having the steps of
rotating the rim and the tyre by means of an electric motor during an assembling or disassembling operation, wherein the tyre is assembled onto the rim by means of at least one assembling tool or is disassembled by means of at least one disassembling tool,
measuring the temperature of the tyre and/or the forces acting on the tyre during the assembling or disassembling operation, and
recording the measured temperature of the tire and/or the measured forces onto a data carrier.

Further, the invention provides an apparatus for assembling a tyre onto the rim of a vehicle wheel or for disassembling a tyre from the rim of a vehicle wheel, comprising
an electric motor for rotationally driving the rim and the tyre during the assembling or disassembling operation,
tools for assembling or disassembling the tyre onto the rim or from the rim,
measuring means for measuring the tyre temperature and/or forces acting on the tyre during the assembling of disassembling operation and
recoding means for recording on at least one data carrier the measured values of the tyre temperature and/or of the forces acting on the tyre during the assembling or disassembling operation.

The recorded values of the measured tyre temperature and/or of the measured forces deliver information about the correctness of the performed assembling or disassembling operation. Especially, if the measured values of the tyre temperature and/or of the forces are compared with predetermined values of the tyre temperature and/or of the forces acting on the tyre, wherein the predetermined values are determined in dependence of the type of the tyre, an observation of the performed assembling or disassembling operation is enabled. Preferably, the measured values of the tyre temperature and/or of the forces acting during the assembling or disassembling operation are recorded on the data carrier.

Further, the measured values of the tyre temperature and/or of the measured forces can be stored by means of a memory. The measured values of the tyre temperature and/or of the measured forces can be recorded by means of a printing device. For recording the measured values, the recording means can include a recording device adapted to record the values of the measured tyre temperature and/or of the forces acting on the tyre onto a data disc. Other appropriate recording devices and recording mediums, for instance, magnetic tapes can be used as well.

The measured tyre temperature is preferably the core temperature of the tyre. The core temperature is the internal temperature of the tyre material, especially in the area of the side walls of the tyre and of the tyre beads. The tyre temperature is measured preferably by the measurement of the infrared radiation emitted from the tyre. This radiation can be determined by means of infrared cameras, especially by means of thermographic cameras. Further appropriate temperature measuring means are disclosed in EP 2 100 756 B1.

Especially, when assembling or disassembling runflat tyres or UNP (Ultra High Performance) tyres, the core temperature during the assembling or disassembling operation should be maintained in the range of 15° C. to 27° C., preferably at 23° C.

Preferably, the forces acting at the traction point or traction area at which the torque of the electric motor is transmitted from the rim to the tyre are measured during the assembling or disassembling operation. The forces acting at the traction point or the traction area correspond to the torque which is generated by the electric motor during the assembling or disassembling operation.

This torque is proportional to the amount of current drained by the electric motor driving the rim and the tyre during the assembling or disassembling operation. Therefore, the measurement of the electric current drained by the electric motor during the assembling or disassembling of the tyre can be used for the determination of the forces acting on the traction point or traction area between the tyre and the rim. These forces include also the forces acting between the assembling tool or the disassembling tool and the tyre, especially the tyre bead. Preferably, the forces acting at the assembling tool or at the disassembling tool on the tyre and especially acting on the tyre bead can be measured by an appropriate measuring device or measuring devices. The measuring devices can be provided at the assembling tool or at the disassembling tool or at the respective tool holder which supports the respective tool against the forces to be measured.

The present invention is in particular preferable if the method and/or the apparatus are used for assembling a runflat—or UHP tyre onto a rim of a vehicle wheel or for disassembling a runflat—or UHP tyre from the rim of a vehicle wheel.

Further advantages and a preferred embodiment will be described in the following together with the drawings listed below.

Figure 4:
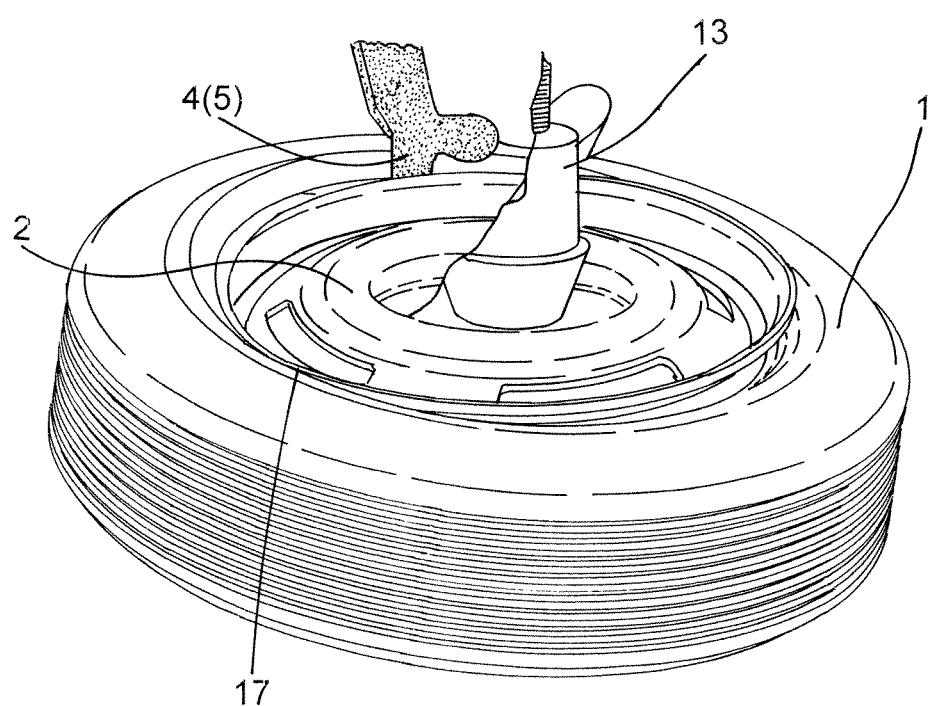

FIG. 4 serves for illustrating the traction point (area) during the assembling or disassembling operation.

Figure 1:
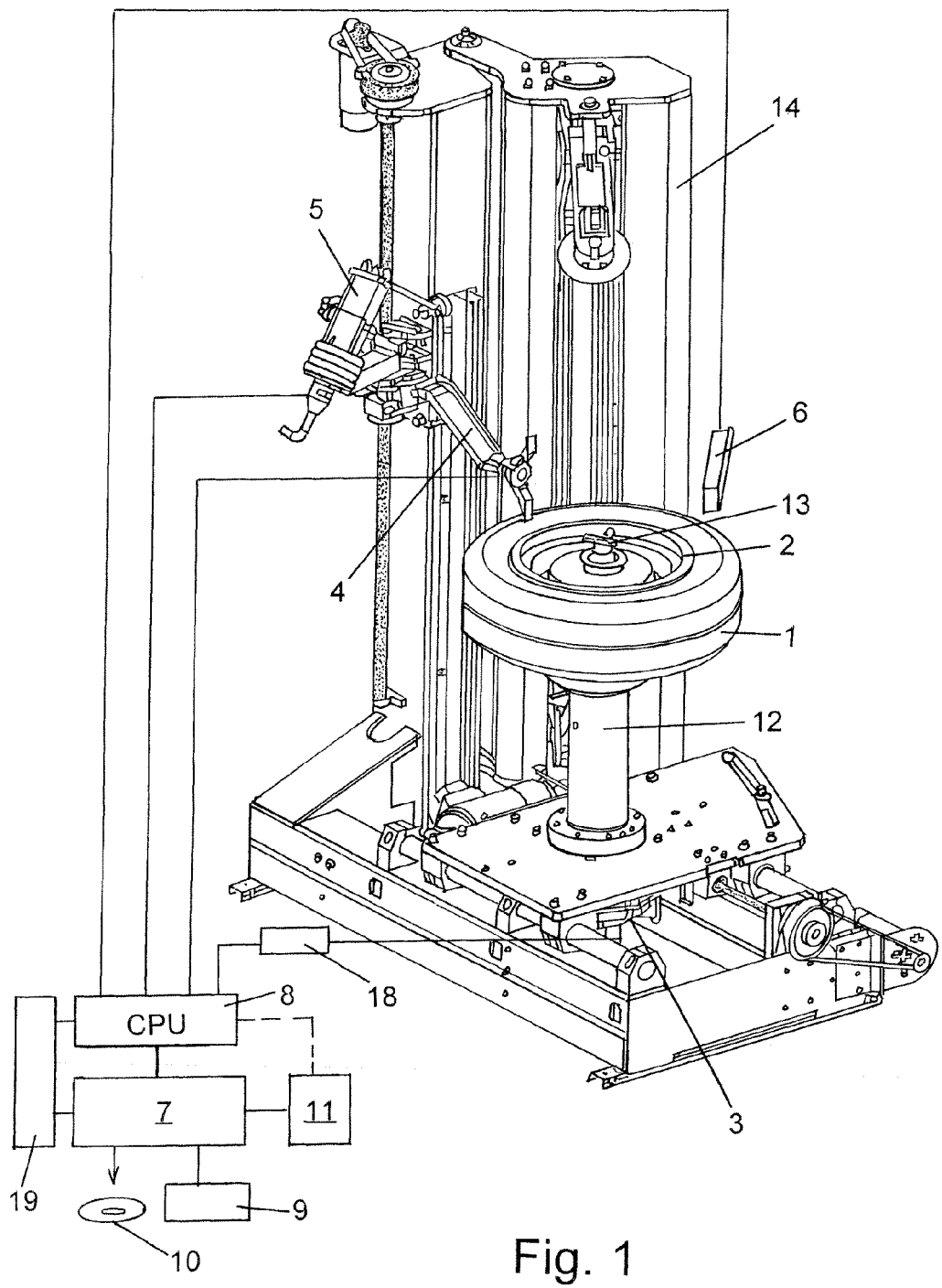
FIG. 1 shows a tyre changer at which an embodiment of the invention is realized.
Figure 2:
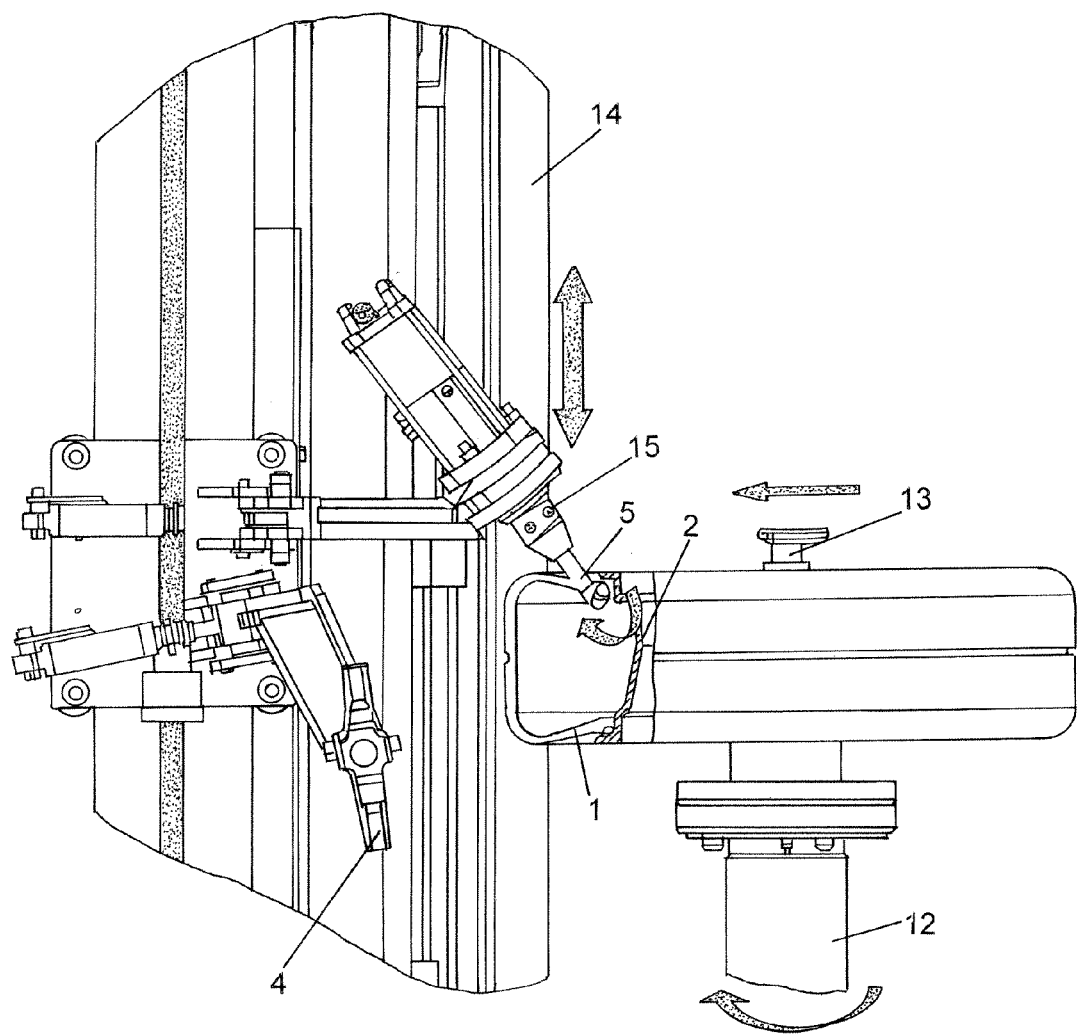
FIG. 2 shows a disassembling tool of the embodiment.
Figure 3:
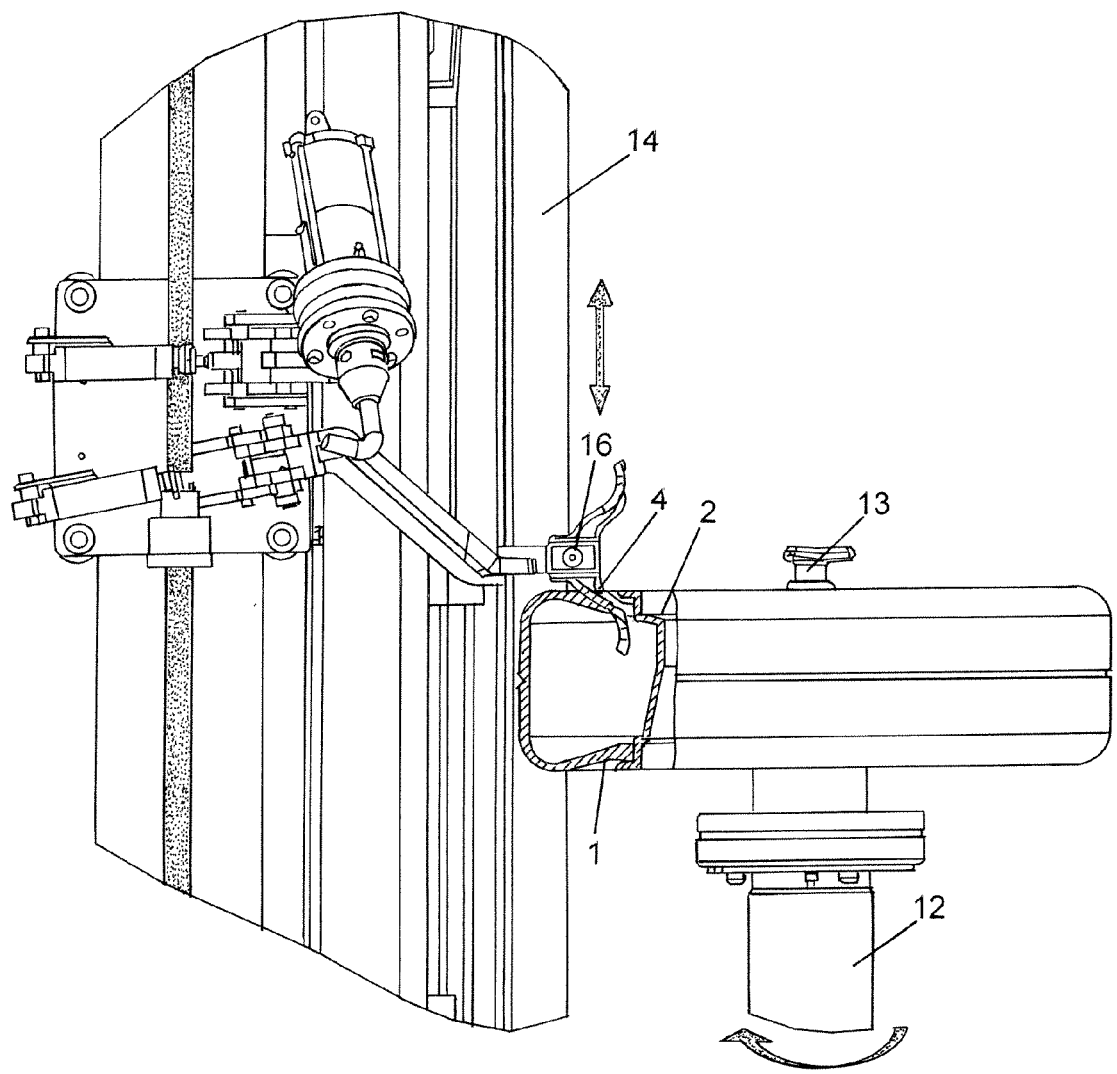
FIG. 3 shows an assembling tool of the embodiment.

FIG. 1 illustrates a tyre changer comprising a vertical support frame 14 at which an assembling tool 4 and a disassembling tool 5 are movably guided into respective positions during an assembling operation, as schematically shown in FIG. 3, or during a disassembling operation, as schematically shown in FIG. 2.

A vehicle wheel comprising a rim 2 and a tyre 1 can be positioned and fixed on a rotary support 12 by means of a self-centering device 13. The rotary support 12 and the vehicle wheel can be rotationally driven by means of an electric motor 3 during the assembling operation and during the disassembling operation. The torque of the electric motor 3 is transmitted to the rim 2 via the rotary support 12. The frictional force in a traction point or traction area 17 (FIG. 4) effects that the tyre 1 is rotated together with the rim 2 with respect to the assembling tool 4 during the assembling operation or to the disassembling tool 5 during the disassembling operation. In FIG. 4, one tool element is schematically illustrated for the assembling tool 4 and the disassembling tool 5. FIG. 4 denotes the traction point or traction area 17 within which of the tyre bead is positioned with strong frictional force at the rim edge.

According to the invention, the embodiment is provided with means for determining and recording the tyre temperature, especially the core temperature of the tyre and/or the forces acting on the tyre during the assembling operation or the disassembling operation.

For determining the temperature of the tyre 2, the illustrated tyre changer is provided with a temperature measuring device 6 for measuring the tyre temperature, especially the infrared radiation emitted from the tyre 2. The temperature measuring device 6 can include an infrared detector for a contacless temperature measurement. Appropriate temperature measuring devices are described in EP 2 100 756 B1 as well. The temperature measuring device 6 is connected to an electronic computing device 8 (CPU) which calculates the respective value of the detected tyre temperature. The temperature measuring device 6 can be adapted to calculate the value of measured temperature as well. The value of the measured temperature is recorded in recording means 7 which is adapted to record the measured temperature value on a data carrier 10.

For determing the forces acting on the tyre 1 during the assembling or disassembling operation, the electrical current drained by the electric motor 3 is measured by means of a current measuring device 18 which is connected to the electric motor 3. The measured amount of the drained current is proportional to the motor torque generated by the electric motor 3 and transmitted to the rim 2 and via the traction point or traction area 17 to the tyre 1. The transmission of torque from the electric motor 3 to the rim 2 is performed via a substantially rigid connection, provided by the rotary support 12 and the self-centering device 13, so that the measured current is proportional to the forces acting within the traction point or traction area 17. The respective calculation for obtaining respective measured force values can be done by means of the computing means 8 to which the current measuring device 18 is connected. The measured force values can be recorded by the recording means 7 which are adapted to record the measured force values onto an appropriate data carrier.

The forces acting in the traction point or traction area 17 are influenced by the forces acting between the assembling tool 4 or the disassembling tool 5 and the tyre 1 especially in the tangential direction of the tyre during the assembling operation or disassembling operation. These forces can be measured by respective force measuring devices which are provided on the assembling tool 4 and on the disassembling tool 5 or on the respective tool holders. FIG. 2 denotes a force measuring device 15 which measures the forces between the tyre 1 and the disassembling tool 5 during the disassembling operation and FIG. 3 denotes a force measuring device 16 which measures the forces acting between the assembling tool 4 and the tyre 1 during the assembling operation. The force measuring devices 15 and 16 are connected to the computing device 8 (FIG. 1) and/or to the recording means 7. The force measuring devices 15, 16 can be provided with piezo-elements or strain gauges or other appropriate force measuring sensors. The force measuring devices 15, 16 provides preferably a one-dimensional measurement, especially in the tangential direction of the tyre 1, but a three-dimensional measurement including the tangential direction of the tyre 1 is also possible.

The influence of the forces generated by the action of the assembling tool 4 and the disassembling tool 5 can be reduced by soaping the tyre region around the tyre bead, especially of the upper tyre bead.

The recording means 7 are connected to the computing means 8, but the computing means 8 can be implemented by the recording means 7, as well. The recording means 7 are equipped with devices which can record on an appropriate data carrier the measured values of the tyre temperature and/or of the forces acting on the tyre 1. In one embodiment, the measured values are printed by a printing device 9 on a printable carrier like paper. Further, the measured data can be recorded onto a data disc 10 by means of an appropriate device or onto a storing chip. The storing of the measured data is also possible, for instance in a memory 11 which is connected to the computing device 8 or to the recording means 7. The memory 11 can be a part of the computing device 8 or of the recording means 7 or can be a storing medium like a magnetic tape. An indicating device 19, for instance a display or monitor, can be connected to the computing device 8 and/or to the recording means 7 for displaying the measured data.

The recorded measurement data of the tyre temperature and/or of the forces acting on the tyre during the assembling operation or disassembling operation provide an information and documentation about the correctness of the actions performed on the tyre during assembling or disassembling the tyre in a tyre changer.

The computing means 8 are preferably adapted to compare the measured values of the tyre temperature and/or of the force acting on the tyre 1 with predetermined values of the tyre temperature and/or of the forces determined in dependence of the type of the tyre, so that an additional observation of the assembling and disassembling operations is possible. The result of the comparison can be recorded on the data carrier and can be displayed on the indication device 19.

The invention is preferably used for assembling or disassembling of runflat—tyres or of UHP—tyres.

FEATURE LIST 1 tyre
2 rim
3 electric motor
4 assembling tool
5 disassembling tool
6 temperature measuring device
7 recording means
8 computing means
9 printing device
10 data disc
11 memory
12 rotary support
13 self-centering device
14 vertical support frame
15 force measuring device
16 force measuring device
17 traction point (area)
18 current measuring device
19 indication device

The invention claimed is:

1. A method for assembling a tyre onto a rim of a vehicle wheel or disassembling a tyre from a rim of a vehicle wheel, comprising the steps of
  rotating the rim and the tyre by means of an electric motor during an assembling or disassembling operation, wherein the tyre is assembled onto the rim by means of at least one assembling tool or is disassembled by means of at least one disassembling tool,
  measuring the temperature of the tyre and/or the forces acting on the tyre during the assembling or disassembling operation, and
  recording the measured temperature of the tire and/or of the measured forces onto a data carrier.

2. The method according to claim 1,
  wherein the measured values of the tyre temperature and/or of the measured forces are stored.

3. The method according to claim 1,
  wherein the measured values of the tyre temperature and/or of the measured forces are recorded.

4. The method according to claim 1,
  wherein the measured values of the tyre temperature and/or of the forces are compared with predetermined values of the tyre temperature and/or of the forces acting on the tyre,
  wherein the predetermined values are determined in dependence of the type of the tyre.

5. The method according to claim 4,
  wherein the result of the comparison is recorded on a data carrier.

6. The method according to claim 1,
  wherein the forces acting at the traction point or traction area at which the torque is transmitted from the rim to the tyre are measured during the assembling or disassembling operation.

7. The method according to claim 1, wherein the amount of current drained by the electric motor driving the rim and the tyre during the assembling or disassembling operation is measured.

8. The method according to claim 1,
  wherein the forces acting on the tyre at the assembling tool or at the disassembling tool are measured.

9. An apparatus for assembling a tyre onto the rim of a vehicle wheel or for disassembling a tyre from the rim of a vehicle wheel, comprising
  an electric motor for rotationally driving the rim and the tyre during the assembling or disassembling operation,
  tools for assembling or disassembling the tyre onto the rim or from the rim,
  measuring means for measuring the tyre temperature and/or forces acting on the tyre during the assembling or disassembling operation, and
  recording means for recording on at least one data carrier the measured values of the tyre temperature and/or of the forces acting on the tyre during the assembling or disassembling operation.

10. The apparatus according to claim 9, additionally comprising a
  memory for storing the measured values of the tyre temperature and/or of the forces acting on the tyre during the assembling or disassembling operation.

11. The apparatus according to claim 9,
  wherein the recording means include a printing device or is adapted to record the measured values on a data disc.

12. The apparatus according claim 9,
  wherein the measuring means are connected to computing means adapted to compare the measured values of the tyre temperature and/or of the force acting on the tyre with predetermined values of the tyre temperature and/or of the forces defined in dependence of the type of the tyre.

13. The apparatus according to claim 9,
  wherein the measuring means include a measurement device adapted to measure the traction force acting between the rim and the tire.

14. The apparatus according to claim 9,
  wherein the measuring means include at least one measurement device adapted to measure the forces acting between the tyre and an assembling tool and/or a disassembling tool during the assembling or disassembling operation.

15. The apparatus according to claim 9,
  wherein the measuring means include a measurement device adapted to measure the electric current drained by the electric motor during the assembling or disassembling operation.

* * * * *